United States Patent
Kawaguchi et al.

(10) Patent No.: US 7,373,632 B1
(45) Date of Patent: May 13, 2008

(54) SYSTEM AND METHOD FOR DYNAMIC GENERATION OF PROXIES FOR ISOMORPHIC INTERFACES

(75) Inventors: Kohsuke Kawaguchi, Santa Clara, CA (US); Ryan C. Shoemaker, Acton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 881 days.

(21) Appl. No.: 10/724,921

(22) Filed: Dec. 1, 2003

(51) Int. Cl.
*G06F 9/44* (2006.01)
*G06F 9/45* (2006.01)

(52) U.S. Cl. .................. 717/100; 709/203; 717/103

(58) Field of Classification Search ........ 717/100–108, 717/114–118, 121–122; 709/203
See application file for complete search history.

(56) References Cited

U.S. PATENT DOCUMENTS

| | | | |
|---|---|---|---|
| 5,953,526 A * | 9/1999 | Day et al. .................. | 717/108 |
| 6,011,918 A * | 1/2000 | Cohen et al. ............... | 717/106 |
| 6,272,672 B1 * | 8/2001 | Conway ..................... | 717/107 |
| 6,324,543 B1 * | 11/2001 | Cohen et al. ............... | 707/200 |
| 6,370,685 B1 * | 4/2002 | Robison ..................... | 717/141 |
| 6,546,546 B1 * | 4/2003 | Van Doorn ................. | 717/114 |
| 6,567,801 B1 * | 5/2003 | Chiang et al. .............. | 707/3 |
| 6,601,233 B1 * | 7/2003 | Underwood ................ | 717/102 |
| 6,678,733 B1 * | 1/2004 | Brown et al. ............... | 709/229 |
| 6,745,384 B1 * | 6/2004 | Biggerstaff ................. | 717/156 |
| 6,795,864 B2 * | 9/2004 | Connor ...................... | 709/232 |
| 6,901,588 B1 * | 5/2005 | Krapf et al. ................ | 717/164 |
| 6,918,106 B1 * | 7/2005 | Burridge et al. ............ | 717/100 |
| 6,931,623 B2 * | 8/2005 | Vermeire et al. ........... | 717/108 |
| 6,996,798 B2 * | 2/2006 | Ali et al. .................... | 717/100 |
| 7,047,488 B2 * | 5/2006 | Ingersoll et al. ............ | 715/523 |
| 7,120,639 B1 * | 10/2006 | de Jong et al. ............. | 707/101 |
| 7,188,331 B2 * | 3/2007 | Culter ........................ | 717/100 |
| 7,210,117 B2 * | 4/2007 | Kudukoli et al. ........... | 717/100 |

OTHER PUBLICATIONS

Vragov, "Implicit consumer collusion in auction on the internet", IEEE, pp. 1-9, 2005.*
Halfond et al, "Improving test case generation for web applications using automated interface discovery", ACM ESEC, pp. 145-154, 2007.*

(Continued)

*Primary Examiner*—Anil Khatri
(74) *Attorney, Agent, or Firm*—Robert C. Kowert; Meyertons, Hood, Kivlin, Kowert & Goetzel, P.C.

(57) ABSTRACT

System and method for proxying isomorphic interfaces in different subsystems. Embodiments may provide a proxy mechanism that may generate proxies for isomorphic interfaces at runtime. Embodiments may allow two mutually indifferent subsystems to communicate with each other in a straightforward, transparent manner via proxies, without requiring a common shared library or complex coding. Embodiments of the proxy mechanism transparently generate proxies for isomorphic interfaces between subsystems in a virtual machine. In one embodiment, the application developer registers the interfaces that require proxying. The proxy mechanism then generates proxy instances. Methods may then be invoked, and the proxies handle the details of converting and forwarding the calls in accordance with the appropriate interface. Other subsystems, using different versions of the interface, may use the proxy mechanism to dynamically generate proxies without requiring extensive coding or shared libraries, and without interfering with other subsystems within the virtual machine.

57 Claims, 5 Drawing Sheets

OTHER PUBLICATIONS

Liarokapis et al, "Design experiences of multimodel mixed reality interfaces", ACM SIGDOC, pp. 34-41, 2007.*

Sousa et al, "Using IMML and XICL components to develop multidevice web based user interface", ACM IHC, pp. 138-147, 2006.*

Chuck McManis, "Take an in-depth look at the Java Reflection API," http://javaworld.com/javaworld/jw-09-1997, Sep. 1997, (11 pages).

Alexandre Pereira Calsavara, "Put the Java Reflectiion API to Work in Your Apps," http://uk.builder.com/programming/java/0.39026606.20270549.00.htm, Dec. 10, 2002, (3 pages).

* cited by examiner

SYSTEM AND METHOD FOR DYNAMIC GENERATION OF PROXIES FOR ISOMORPHIC INTERFACES

BACKGROUND OF THE INVENTION

1. Field of the Invention

This invention relates to computer software, and more particularly to proxying isomorphic interfaces in different subsystems.

2. Description of the Related Art

In strongly typed languages such as Java, subsystems typically require explicit knowledge of each other in order to interact. This makes it difficult if not impossible for two mutually indifferent subsystems to be combined at runtime without having a common shared library to bridge the gap. For example, given the following interfaces:

```
Interface orange.Foo {
  void abc( );
}
interface purple.Foo {
  void abc( );
}
void client (purple.Foo foo) {
  void abc( );
}
``` the following call is illegal:

```
client (new orange.Foo( ));
```

If a client is programmed against the purple interface, it cannot directly invoke an object that implements the orange interface even if those two interfaces are isomorphic because Java is a strongly typed language.

To make this legal, so that, in this example, the purples can invoke oranges and vice versa, the commonality needs to be factored out and the two subsystems need to be written against it. However, when those subsystems are evolving rapidly, having a common library introduces challenges that include preserving backward compatibility between versions of the subsystems, since any change in the shared library may affect systems currently deployed. Maintaining such a shared library can quickly become tedious and error-prone.

The Java Reflection API Specification, developed by Sun Microsystems, Inc., enables Java applications to discover information about the fields, methods, and constructors of loaded classes, and to use reflected fields, methods and constructors to operate on their underlying counterparts on objects, within security restrictions. This discovery happens at runtime without any prior knowledge at compilation time. However, Reflection is not transparent to programmers—it requires a non-trivial amount of tedious and potentially fragile code in order to perform simple method calls.

SUMMARY

Embodiments of a system and method for proxying isomorphic interfaces in different subsystems are described. Embodiments may provide a proxy mechanism that may generate proxies for isomorphic interfaces at runtime. Embodiments may allow two mutually indifferent subsystems to communicate with each other in a straightforward, transparent manner via proxies, without requiring a common shared library or complex coding.

Embodiments of the proxy mechanism may be used to transparently generate proxies for isomorphic interfaces in a virtual machine. In one embodiment, the application developer registers the interfaces that require proxying and then writes code in a simple, straightforward fashion. The proxy mechanism then generates proxy instances for the registered interfaces that handle all of the details. Developers may simply invoke methods on objects, and the proxies generated by the proxy mechanism handle the details of converting the calls in accordance with the appropriate interface and forwarding the calls to the target subsystem(s). Thus, embodiments preferably simplify application development compared to other dynamic method invocation mechanisms such as the Java Reflection API.

Embodiments may provide a runtime-generated isomorphic interface within a single running stack of software (e.g. one virtual machine such as a Java Virtual Machine (JVM)) without requiring shared libraries. Embodiments of the proxy mechanism may be applicable, for example, where there are multiple subsystems that need to communicate with each other. Embodiments may also be applicable where subsystems need to share some commonality for interaction (e.g. in a library), but that commonality cannot be placed in a shared region or there may be multiple versions of the subsystems deployed at the same time. Note that embodiments may also be applicable in other scenarios than these exemplary scenarios.

Subsystems may be configured to execute within a virtual machine. These subsystems may include, but are not limited to, applications, libraries, servlets, beans (e.g. JavaBeans), mobile agents, code modules within applications, or in general any unit of code that can execute within the virtual machine. A subsystem may desire or require an interface with one or more of the other subsystems. Note that an interface may be isomorphic; that is, there may be different versions of the interface used by different subsystems in the virtual machine. Embodiments of the proxy mechanism may be used to simplify the task of propagating method calls to the correct subsystem in a virtual machine where there are two or more subsystems with isomorphic interfaces.

Using an embodiment of the proxy mechanism, a first subsystem in the virtual machine may specify an isomorphic interface in the virtual machine to be proxied by the proxy mechanism. There may be two or more subsystems with the isomorphic interface in the virtual machine. The proxy mechanism may then generate a proxy to the isomorphic interface at runtime. In one embodiment, the proxy may be generated in response to the first subsystem specifying what is to be proxied using an API to the proxy mechanism. The first subsystem may then make a method call to the isomorphic interface. In one embodiment, the proxy mechanism generates the proxy when it receives the call from the first subsystem. The proxy converts the call in accordance with the version of the isomorphic interface. The proxy then forwards the converted call to the correct subsystem for execution. In one embodiment, the Java Reflection API may be used to convert and forward the call. Other embodiments may use other mechanisms to convert and/or forward the call. The proxy mechanism may also generate one or more additional proxies to handle results of executing the call that need to be returned to the first subsystem, if necessary. The results may then be converted by the proxies and forwarded to the first subsystem, for example using the Java Reflection API.

Other subsystems within the virtual machine, using a different version of the isomorphic interface, may also use the proxy mechanism to dynamically generate contracts (one or more proxies) for interaction within the virtual machine without requiring extensive coding in the subsystems, and without interference with other subsystems within the virtual machine.

Figure 1:
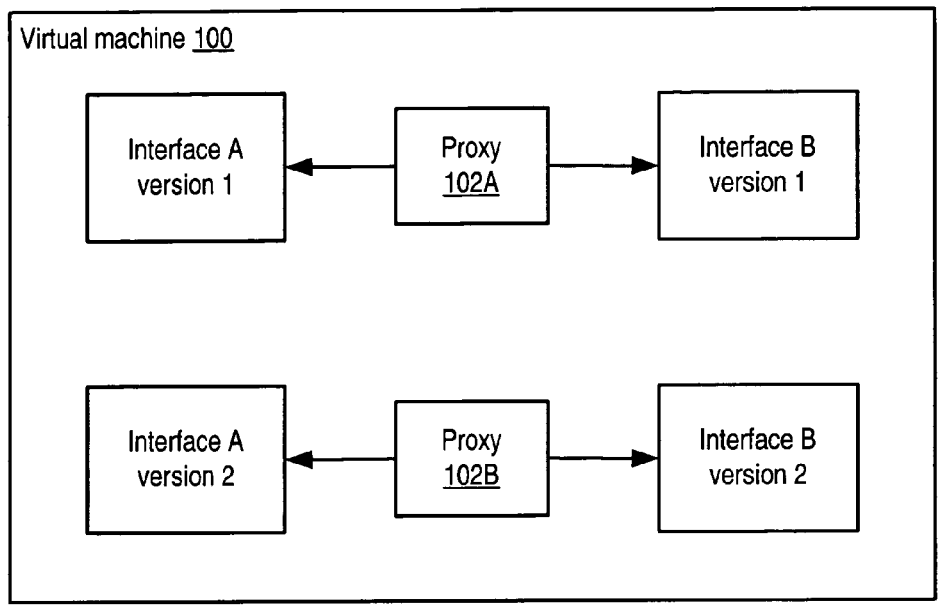
FIG. 1 illustrates multiple versions of an isomorphic interface using the proxy mechanism within the same virtual machine without interfering with each other according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a system and method for proxying isomorphic interfaces in different subsystems are described. Embodiments may provide a proxy mechanism that may generate proxies for isomorphic interfaces at runtime. One embodiment of the proxy mechanism may be provided as a library that provides the proxy generation logic for use in generated code. Embodiments may allow two mutually indifferent subsystems to communicate with each other in a straightforward, transparent manner via proxies, without requiring a common shared library or complex coding. In one embodiment, developers declare which isomorphic interfaces (e.g. Java interfaces) from the various subsystems need to interact, and the proxy mechanism appropriately converts types and/or method calls (including, but not limited to, parameters, return types, and exception handling) that cross the system boundaries. In one embodiment, the proxying mechanism dynamically creates all of the code necessary to bridge the gap between the subsystems at runtime.

Embodiments of the proxy mechanism transparently generate proxies for isomorphic interfaces in a virtual machine. The application developer registers the interfaces that require proxying and write their code in a simple, straightforward fashion. The proxy mechanism then generates proxy instances that handle all of the details. Developers may simply invoke methods on objects, and the proxy instances generated by the proxy mechanism handles the details. Thus, embodiments preferably simplify application development compared to other dynamic method invocation mechanisms such as the Java Reflection API. Since the proxying is handled by code generated at runtime, embodiments may be used to bridge any subsystems containing isomorphic interfaces while not requiring deployment time processing.

Embodiments may provide a runtime-generated isomorphic interface within a single running stack of software (e.g. one virtual machine such as a Java Virtual Machine (JVM)) without requiring shared libraries. Embodiments of the proxy mechanism may be applicable, for example, where there are multiple subsystems (e.g. applications, including, but not limited to, web applications and client applications, programs, code modules, mobile agents, beans (e.g. Enterprise JavaBeans (EJBs), servlets, and libraries) that need to communicate with each other (e.g. application <-> application, web application<->runner (client), agent<->agent, application<->library, library<->library, bean<->bean, etc.). Embodiments may also be applicable where subsystems need to share some commonality for interaction (e.g. in a library), but that commonality cannot be placed in a shared region or there may be multiple versions of the subsystems deployed at the same time. Note that embodiments may also be applicable in other scenarios than these exemplary scenarios.

While embodiments are generally described herein in regards to subsystems within virtual machines, and in particular described for Java subsystems within Java Virtual Machines (JVMs), it is to be understood that embodiments may also be applied in other computing environments and with other programming languages.

FIG. 1 illustrates multiple versions of an isomorphic interface using the proxy mechanism within the same virtual machine without interfering with each other according to one embodiment. Embodiments may allow multiple versions of subsystem(s) to co-exist in the same virtual machine (e.g. a Java Virtual Machine (JVM)) and to communicate with their corresponding peers (other subsystems), which may otherwise be difficult if there is shared library code among them. This may be beneficial, for example, in systems that need to be able to easily maintain backwards compatibility with existing code in future releases. Embodiments allow two subsystems to communicate with each other without having to rely on a common shared library. Subsystems may include, but are not limited to, users or clients of the libraries; e.g. any code module, application, program, mobile agent or even other libraries that access the libraries.

In this example, within virtual machine 100, Interface A version 1 and Interface B version 1 communicate via Proxy 102A, and Interface A version 2 and Interface B version 2 communicate via Proxy 102B. In one embodiment, to generate the proxies 102, the application developer specifies that the Interfaces (A and B, in this example) need to be proxied, and the proxy generator (not shown) then generates the proxies 102 at runtime.

Note that FIGS. 2-8 illustrate means for generating proxies to versions of an isomorphic interface provided by two or more subsystems for one or more other subsystems in a virtual machine at runtime, means for the proxies to convert calls from the one or more other subsystems to the versions of the isomorphic interface provided by the two or more subsystems, and means for the proxies to forward the converted calls to the two or more subsystems for execution.

Figure 2:
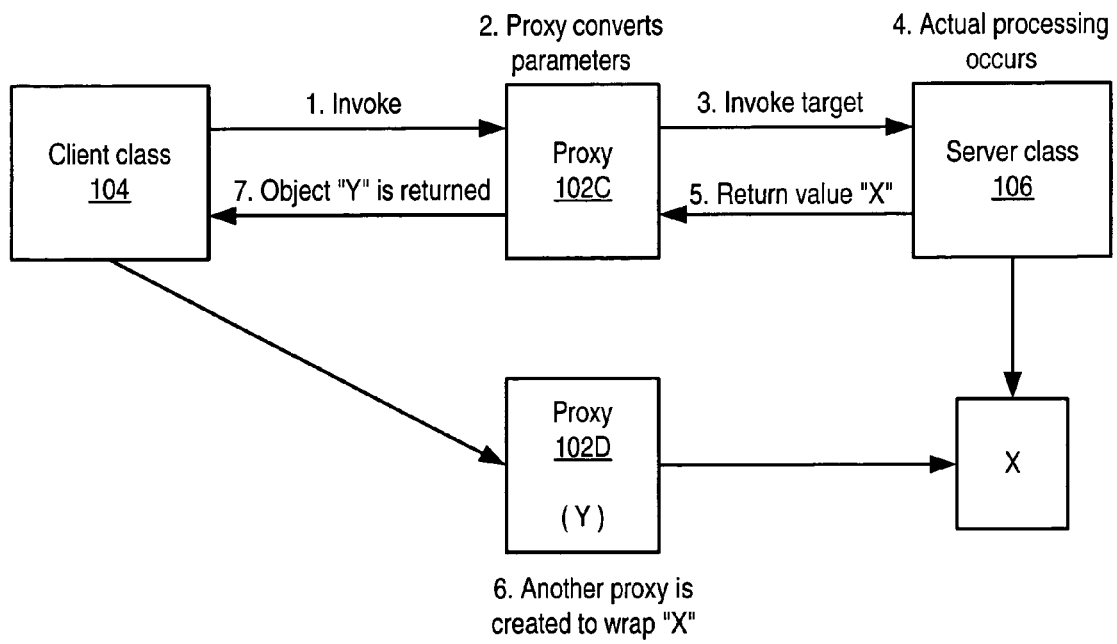
FIG. 2 illustrates a method invocation that is proxied to a peer class in another subsystem according to one embodiment.

FIG. 2 illustrates a method invocation that is proxied to a peer class in another subsystem according to one embodiment. The client class 104 invokes a method (i.e. makes a call) on an interface. In this case, a proxy object 102C has been generated at runtime that intercepts the method call, proxies (or converts) the call and parameter types if necessary, and forwards the method invocation to the appropriate interface type (or version) in another subsystem. The actual method invocation happens in the other subsystem. Note that, in one embodiment, Java Reflection may be used in converting and forwarding of method calls and parameter types. Other embodiments may use other mechanisms for converting and forwarding method calls and parameter types. Also note that, when "call" is used herein, it is generally considered to include whatever parameter types, exceptions, or other data that may be passed when invoking (calling) a method.

FIG. 2 further illustrates handling return of results from the method invocation according to one embodiment. In this example, the server class is returning an instance X of a type from its own subsystem that needs to be proxied. Another proxy object Y is generated at runtime that is returned to the caller. Subsequent method invocations on instance Y may be proxied across to instance X using the same technique.

Figure 3:
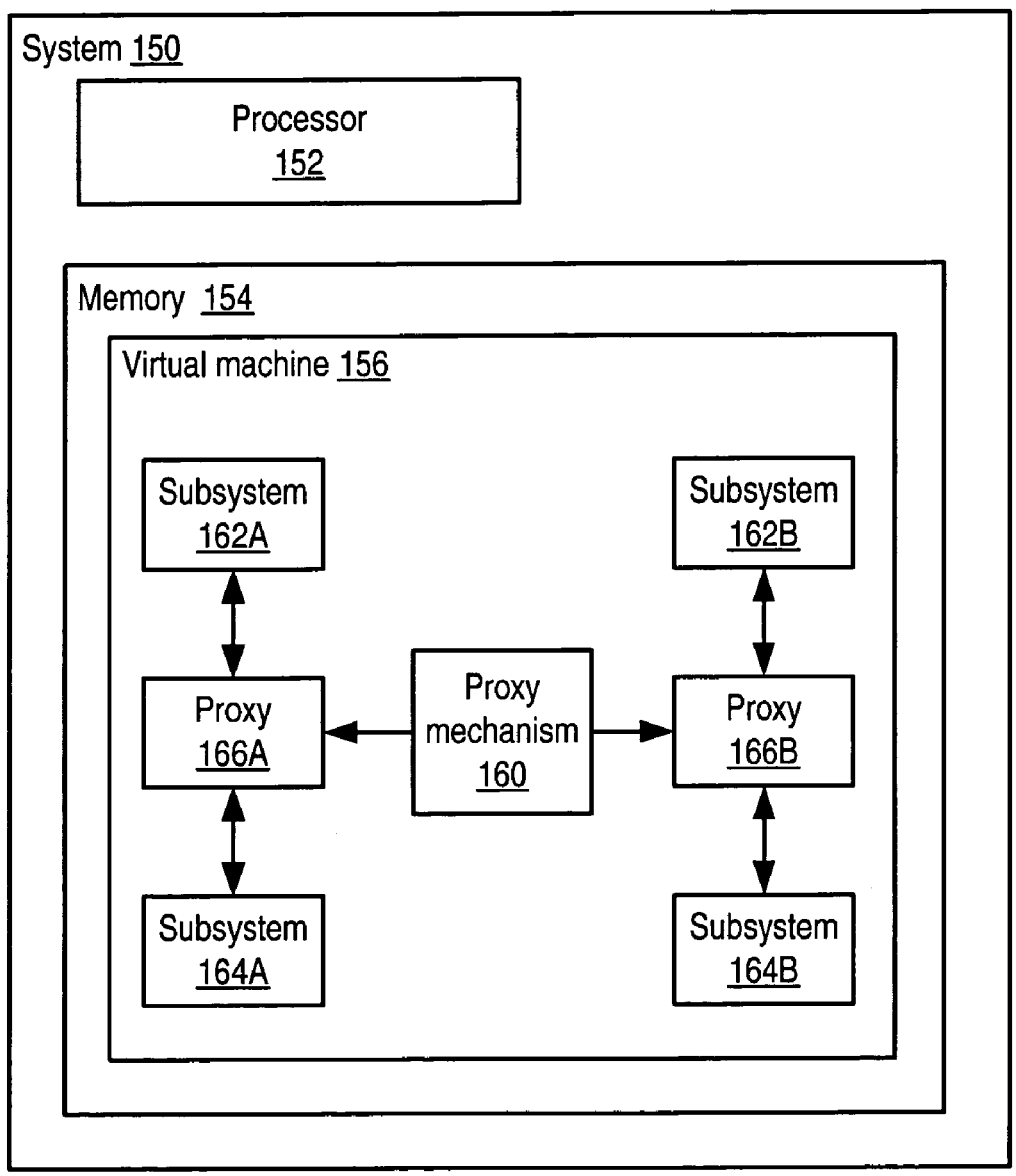
FIG. 3 illustrates a system implementing a proxy mechanism according to one embodiment.

FIG. 3 illustrates a system implementing a proxy mechanism according to one embodiment. System 150 may be any of various types of devices, including, but not limited to, a personal computer system, desktop computer, laptop or notebook computer, mainframe computer system, workstation, network computer, or other suitable device. System 150 may include at least one processor 152. The processor 152 may be coupled to a memory 154. Memory 154 is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof. System 150 may couple over a network to one or more other devices via one or more wired or wireless network interfaces.

System 150 may include, in memory 154, a proxy mechanism 160. In one embodiment, system 150 may include, in memory 154, a virtual machine 156 (e.g. a Java virtual machine) within which proxy mechanism 160 may be implemented. Proxy mechanism may be configured to generate proxies 166 for subsystems (e.g. subsystems running within the virtual machine 156) at runtime. In one embodiment, the proxy mechanism 160 may provide an API via which a developer of a subsystem may specify one or more interfaces of a subsystem for which a proxy interface is to be generated by the proxy mechanism 160. In this example, there are two instances of subsystems (subsystems 162A and 164A and subsystems 162B and 164B) within virtual machine 156 for which proxy mechanism 160 has generated proxies (166A and 166B, respectively) at runtime.

Figure 4:
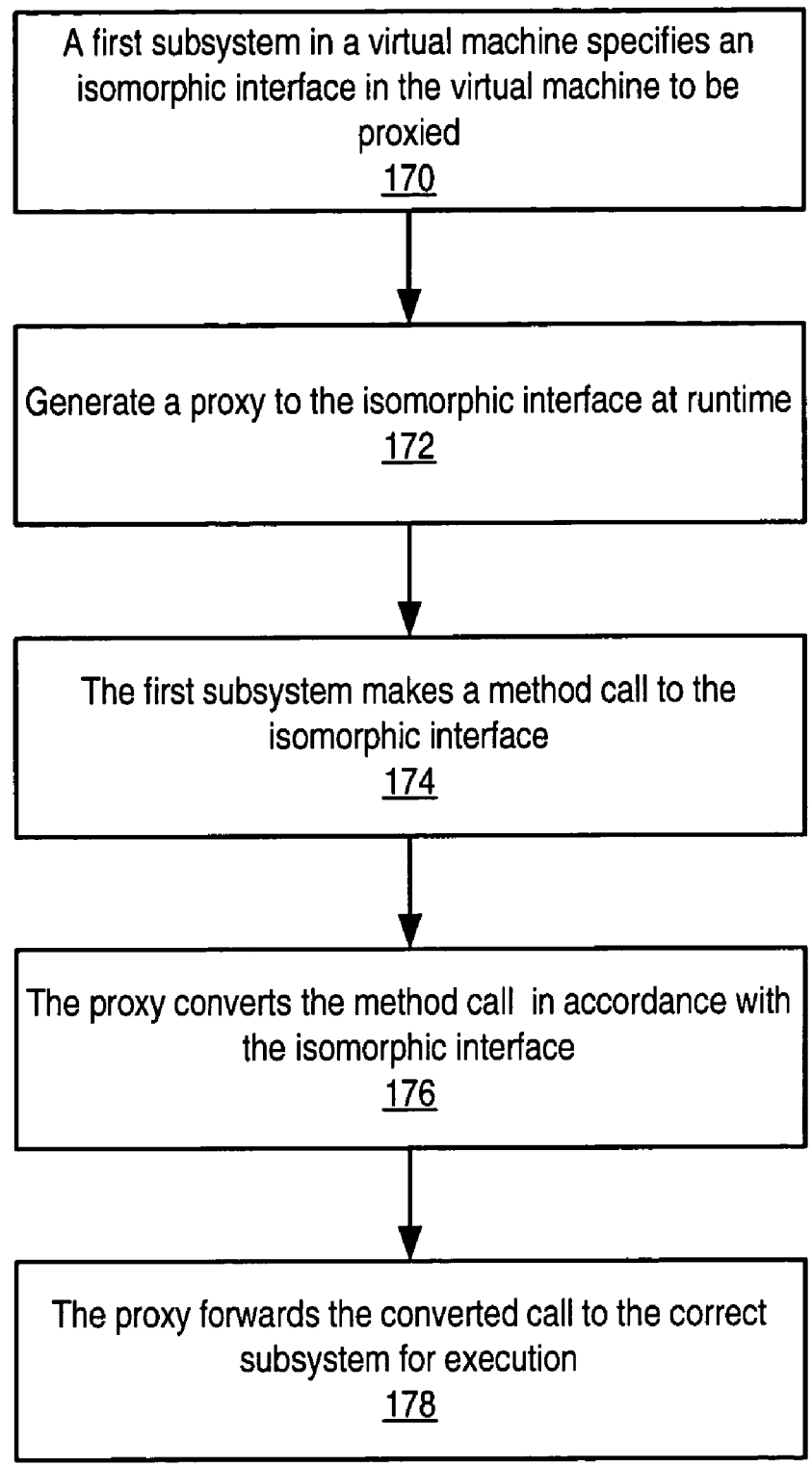
FIG. 4 is a flowchart illustrating operation of a proxy mechanism according to one embodiment.

FIG. 4 is a flowchart illustrating operation of a proxy mechanism according to one embodiment. Subsystems may be configured to execute within a virtual machine. These subsystems may include, but are not limited to, applications, libraries, servlets, beans (e.g. JavaBeans), mobile agents, code modules within applications, or in general any unit of code that can execute within the virtual machine. A subsystem may desire or require an interface with one or more of the other subsystems. For example, two applications, a code module and a library (e.g. a runtime library), two mobile agents, two libraries, etc. may desire or require an interface. Note that an interface may be isomorphic; that is, there may be different versions of the interface used by different subsystems in the virtual machine. Embodiments of the proxy mechanism may be used to simplify the task of propagating method calls to the correct subsystem in a virtual machine where there are two or more subsystems with isomorphic interfaces.

For example, two or more different instances of a code module in the same virtual machine may use a different version of an interface to different versions of a shared library, or two or more mobile agents may use one version of a mobile agent interface to interact, while two or more other mobile agents within the same virtual machine may use another version of the mobile agent interface to interact. Since these subsystems typically have their own class loaders to effectively isolate the subsystems within the virtual machine so that they not interfere with each other, coding the subsystems to interact with other subsystems using isomorphic interfaces within the virtual machine tends to be difficult because of class loading restrictions imposed in the virtual machine environment (e.g. within a Java Virtual Machine (JVM) environment) and the complexity of the code needed to overcome these restrictions.

Using an embodiment of the proxy mechanism, a first subsystem in the virtual machine may specify an isomorphic interface in the virtual machine to be proxied by the proxy mechanism, as indicated at 170. In one embodiment, the proxy mechanism may include an API that specifies one or more method calls of the proxy mechanism with which a subsystem can specify the methods of an isomorphic interface, as well as parameters, exceptions, etc., to be proxied.

As indicated at 172, the proxy mechanism may generate a proxy between the first subsystem and the isomorphic interface at runtime. In one embodiment, the proxy may be generated in response to the first subsystem specifying what is to be proxied using an API to the proxy mechanism. In one embodiment, the code for the first subsystem may include one or more lines of code that invoke the API to the proxy mechanism to proxy the desired portions of the isomorphic interface.

As indicated at 174, the first subsystem may make a method call to the isomorphic interface. Note that, in one embodiment, the proxy mechanism may generate the proxy when the proxy mechanism receives the call from the first subsystem. As indicated at 176, the proxy converts the call in accordance with the version of the isomorphic interface. As indicated at 178, the proxy then forwards the converted call to the correct subsystem for execution (there may be two or more subsystems with the isomorphic interface in the virtual machine). In one embodiment, the Java Reflection API may be used by the proxy to convert and forward the call. Other embodiments may use other mechanisms to convert and/or forward the call.

Note that the proxy mechanism may also generate one or more additional proxies to handle results of executing the call that may need to be returned to the first subsystem. The results may then be converted by the proxies and forwarded to the first subsystem, in one embodiment using the Java Reflection API.

Other subsystems within the virtual machine, using a different version of the isomorphic interface, may also use the proxy mechanism to dynamically generate contracts (one or more proxies) for interaction within the virtual machine without requiring extensive coding in the subsystems or a common shared library, and without interference with other subsystems within the virtual machine.

An exemplary application of an embodiment of the proxy mechanism is in versioning for a compiler that generates code (e.g., Java code) for execution within a virtual machine that has a dependency on one or more runtime libraries. This example is intended to illustrate the use and functionality of an embodiment of the proxy mechanism in a particular application, and is not intended to be limiting. Embodiments of the proxy mechanism may be generically applied in a wide range of other scenarios.

In this exemplary application, a compiler may be an evolving tool; there may be different versions of the compiler that require different versions of the runtime library. At any one time, there may be different versions of the compiler and different versions of the library in use. As new versions of the compiler come out, the code generated using older versions of the compiler as well as new versions of the compiler need to be deployed, potentially within the same virtual machine, and the code needs to be able to find their correct runtime systems. In order for things to work cohesively, each generated code needs to be able to find its own version of the runtime library without affecting the behavior of any other code that happens to be in the same virtual machine.

Conventionally, this may have been handled by placing the library in a commonly known location. For example, code generated by version A of a compiler would use a version of the library contained in org.foo.A; code generated by version B of the compiler would use a version of the library contained in org.foo.B. For each version of the compiler, there would be a version of the runtime libraries. After many releases, there could be many versions of the libraries. If a bug is found in a version, the bug would have to be tracked through all the versions of the library to determine where to make a fix.

Using conventional methods, it is difficult to maintain compatibility of library code across multiple releases. A lot of time, effort and money are invested in developing code based on a version of a compiler, and when a new version of the compiler comes out, the users expect everything to work "as is" with extra features. If the behavior of a specific method in the library interface is changed even in a way considered benign, it might actually change the way that a deployed application using an older version of the library behaves and actually break the code. It is difficult to know, when modifying a library, if a change will break things for previous releases. On development cycles where new versions may be shipped every few months, it may be prohibitive in terms of the development cycle to know which changes will be OK and which may break things.

Therefore, a dynamic mechanism is needed to link the versions of the code and the runtime library. Embodiments of the proxy mechanism provide this dynamic mechanism. Embodiments may provide a mechanism to minimize dependencies across versions of the compiler. For example, the code that is generated by the compiler with version 1 has strong dependencies on the libraries from version 1. Subsequent releases of the compiler will also have dependencies on the library, but embodiments preferably help to limit those to a very small set and allow things to work in a dynamic fashion.

Embodiments may enable the versioning of a runtime library in such a way that a new version can coexist with other versions of the runtime library in the same virtual machine at the same time. Embodiments allow having different versions of the runtime library in one virtual machine while allowing communications between the versions of the library and code designed against the versions of the runtime library. When there are two pieces of code that work independently but share the same version of the library, the proxy mechanism may be used to allow the two to work together in the same virtual machine. Even if there is just one runtime code with different components that use the same version of the library, the proxy mechanism may be used to allow the components to work together.

Embodiments provide a mechanism to freely modify library code without worrying about breaking things in previous releases or causing problems in future releases. A developer can freely modify the library code; at runtime, the proxying mechanism puts it all together transparently to the application developer and everything works. Embodiments provide a mechanism to evolve libraries in order to handle additional features and functionalities in the software without breaking backwards compatibility of deployed code. Thus, for developers working on a library that is deployed as multiple versions, embodiments may ease the development of the library because the developers do not have to worry if they are making an incompatible change.

Embodiments may provide an automatically generated contract between two different classes, rather than a static interface between classes. Embodiments may automatically generate proxies so there is a piece of the runtime version that does not change across releases, and some code that may change between releases. The proxy mechanism automatically generates the contracts needed, providing a solution to the problem of making incompatible changes in the runtime libraries. The contract that the end client application developer uses does not change, though the runtime libraries may.

Embodiments preferably do not affect the way the end user uses the library, and the end user preferably does not have to know that the proxy mechanism is being used behind the scenes. End user applications interact with a middle layer, which interfaces with the runtime libraries through the proxy mechanism; the client application preferably does not interact directly with the runtime libraries. The end client application developer programs against an interface at one level; underneath the interface are the runtime libraries that the proxy mechanism serves as a bridge to.

In one embodiment, a developer that is using the proxy generator declares which isomorphic interfaces (classes) from the various subsystems need to interact, and thus need to be proxied. The proxy mechanism appropriately converts types and method calls across the subsystem boundaries. One embodiment may include a basic initialization step where the developer declares the set of classes that needs to be proxied. In one embodiment, the developer of the library identifies a set of interfaces as an exposed contract that may need to be proxied. The client of the library (e.g. the application developer) then takes those published interfaces and copies them into their code. That yields pairs of isomorphic interfaces. The necessary interfaces are passed to the proxy generator to generate proxies for them. The proxies generated by the proxy mechanism may then forward or redirect subsequent calls to the proxied interfaces to the proper locations (runtime libraries) when the methods are called.

In one embodiment, the proxy mechanism performs redirection between function calls and libraries or packages. In one embodiment, the proxy mechanism may use Java's Reflection API to perform the redirection of calls to the proper library. Built in to the Java Developers' Kit (JDK) is the Reflection API and a utility that, given an object and a list of interfaces, generates a proxy that can make that object look like an instance of any one of those interfaces. This embodiment may leverage code from the JDK to enable the dynamic rerouting of method calls to the proper versions of a runtime library. Directly using the Reflection API, the developer would have to know in advance the objects and interfaces, and would have to include the potentially lengthy and fragile Reflection code (or some other redirection mechanism) in the code being developed. Embodiments may include a registration step where the proxy mechanism is provided by the developer with an interface to be proxied; the proxy mechanism then generates all the necessary proxies for the interface, including the necessary Reflection code. Once complete, the proxying happens automatically as the functionality provided by the JDK takes over. Thus, a developer merely has to provide the mechanism with the interfaces to be proxied; the proxy mechanism handles the generation of the proxy code, simplifying application development. Note that other embodiments may use other techniques or mechanism than the Java Reflection API to perform redirection via the proxy mechanism.

In reference to this exemplary application of embodiments of the proxy mechanism, FIG. 1 may be used to illustrate multiple versions of the same runtime library in the same virtual machine. The classes labeled "Interface A version 1" and "Interface A version 2" may be code (e.g. Java code) generated by the compiler. "Interface B version 1" and "Interface B version 2" are the versions of the runtime libraries. In a conventional architecture where versions of runtime libraries are stored in a commonly known location, multiple versions of the same class with the same name cannot exist in the same virtual machine at the same time due to typing constraints. Embodiments of the proxy mechanism make it possible for multiple versions of the same class with the same name to co-exist in the same virtual machine through the use of proxies.

Continuing with the exemplary application of the proxy mechanism, a subset of classes in the runtime library that will typically vary from one release of the compiler to the next may be identified. At runtime, after running the compiler and generating code, a developer may use the code to develop an application. When developing an application, there is typically no way of knowing at compile time how the classes are going to be dynamically joined at runtime. One embodiment may include a registration step where the classes within the runtime libraries or packages that are to be proxied are made known to the proxy generator at runtime. Using that list of packages, embodiments of the proxy mechanism automatically generate proxy code so that calls to those classes are automatically traversed across those packages to find the right parts of the runtime library to invoke. When the code is deployed, the proxy mechanism looks at which libraries are actually used and generates the proxy code. The developer does not have to write Reflection or other code to invoke the correct library classes; the developer simply writes the application code and specifies the packages; at runtime, the proxy mechanism makes sure the method calls go to the correct library classes.

The developer may not know which version of the library is actually being used at runtime. The actual proxying is handled by the proxy mechanism transparently from the perspective of the application developer. At runtime, proxying is performed transparently to the user and to the generated code. The code (e.g., an application) may always call the same version of the runtime library; the code does not need to know where the library is located, or in which package the library is located. The code is compiled against a specific version of the library and interfaces with a public API of the library when it is compiled. At runtime, the code may ask for the library that implements the interface. The proxy mechanism bridges between the actual package where the library is located and the interface that the code is compiled against.

Traditionally, there would be a separate runtime library for each version and the developer would have to know where they were located, or alternatively one runtime library would need to be maintained to work for all previous versions of the code using the library. Using embodiments, the code developer compiles for a particular version of the runtime library, but does not have to know that one version is maintained separately from another version. The proxy mechanism takes care of mapping the code to the runtime library version "behind the scenes."

Thus, embodiments provide a mechanism for handling versioning of software libraries dynamically. The libraries are isomorphic and have the same signatures, but are generated into different software packages. The libraries may perform the same functions, but are composed dynamically at runtime. Embodiments provide a mechanism for making those isomorphic packages appear as one single unified package to a client application. For two libraries to work together, the libraries must share some common knowledge beforehand. Conventionally, the way to have such common knowledge is to place something (e.g. interface information) in a commonly known location. Embodiments of the proxy mechanism preferably eliminate the need for that single point of common knowledge and do not require common knowledge to be specified in a commonly known location.

In one embodiment, a proxy (or proxies) for a runtime library (or libraries) may be generated at runtime. In another embodiment, the proxy or proxies may be generated when an application is compiled. Note that, in this exemplary application of the proxy mechanism, the application does not interact with the runtime library directly. The interaction is a layer deeper than the client application interacting with a library; it is a client application interacting with a library that interacts with other (runtime) libraries. It is the other libraries that are dynamically handled by the proxy mechanism.

An example of using the proxy mechanism with runtime libraries is with Java Architecture for XML Binding (JAXB). JAXB provides an API and tools that automate the mapping between XML documents and Java objects. In JAXB, logically, there is a version of the runtime library for each version of the compiler. Instead of having these libraries in self-contained packages of code placed in commonly known locations, the libraries may be generated at compile time by the compiler and joined dynamically using the proxy mechanism.

Continuing with the JAXB example, at least some library code is pushed into the generated code, which is joined at runtime by the proxy code. The runtime libraries use the proxy code to dynamically put the libraries together at runtime. For each version of the compiler, the libraries can be modified. If someone is using a version of the compiler to develop and deploy an application that dynamically causes classes from different versions of the library to be used together, the proxy code dynamically determines which libraries need to be invoked to perform the functionality of the application. There is a dependency between the library, the generated source code, and the client application, but the dependency is handled dynamically by the proxy mechanism instead of being explicitly handled by the user by matching the version of the compiler with a version of the library. This is a layer deeper than the client application talking to a library, and so is handled dynamically at runtime by the proxy mechanism transparent to the end developer.

The following describes exemplary potential use cases of embodiments of the proxy mechanism. These exemplary use cases are included for illustrative purposes and are not intended to be limiting.

Figure 5:
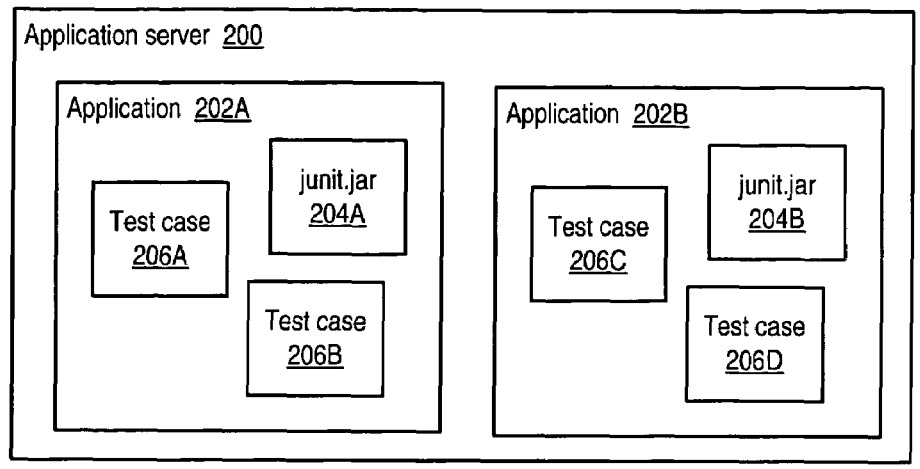
FIGS. 5 and 6 illustrate a JUnit test runner within a J2EE application server as an exemplary potential use case for an embodiment of the proxy mechanism.

A first exemplary, potential use case is a JUnit test runner in a J2EE application server, as illustrated in FIG. 5 according to one embodiment. Note that this is a simplified example to illustrate how an embodiment of the proxy mechanism may be applied and used under similar circumstances. In the case of deployed applications (e.g. web applications), if these applications were EJBs or Servlets, for example, each of them would typically be loaded in their own independent class loaders specifically so that classes do not interfere with each other. Typically, in a virtual machine (e.g. Java virtual machine), each application has its own dedicated class loader to isolate the applications from interfering with each other in terms of which versions of classes get picked up.

JUnit is an open source testing framework (library) that allows the user to use a set of well-defined interfaces to write test cases, and provides a framework to run test cases and provide statistics, e.g. about "passing" and "failing". JUnit may be used stand-alone, in an application server, or in other environments. An application that wants to make use of the JUnit framework may include a JAR file that contains all the Junit interfaces and classes.

In the exemplary-scenario illustrated in FIG. 5, an application server 200 may include two deployed applications 202A and 202B, developed independently by third parties (note that the applications may be any type of applications (e.g. web applications), code modules, servlets, programs, application subsystems, etc.). For the sake of discussion, these applications each include one or more JUnit test cases 206 that can be run upon deployment to ensure proper behavior (i.e. that the application is working correctly). Since different parties developed the applications, each of the applications is deployed with its own junit.jar 204. In one embodiment, the applications may be using different versions of JUnit.

A developer may desire to write a program that collects and runs all the test cases in the application server 200 at once. Thus, in the example, a third web application (e.g. a "JUnit runner application") may be deployed on the application server 200 and that queries each of the other deployed applications 202 to determine if they have JUnit test cases 206 and, if so, get the test cases 206 to be run, run them, and report back the test results. Thus, after this application is deployed, there are three applications on the application server 200, each with its own copy of JUnit, a third-party library. The versions of the JUnit library are potentially different.

The JUnit runner application may, for example, include the following:
    import junit.framework.Test;
    TestListener testResultCollector = . . . ;
    for each application W in the server {
        for each test case T in W {
            Object o = create instance of T via reflection;
            Test t = (Test)o;
            t.run(testResultCollector);
        }
    }

In this exemplary code, for each application in the server, a set of test cases is collected and iterated over. The Test class is a class defined in the JUnit library. What would normally be done is to look up the Test object and cast it to an instance of the JUnit test, and then invoke the method that causes the test to be run. The last two lines are how JUnit is normally used.

Note that this code does not work because the casting fails. If there are two identical classes that are loaded by different class loaders within the same virtual machine, two instances of the same class from different class loaders are considered different classes, and thus cannot be directly cast. The Test interface implemented by T and the Test interface in the test runner are loaded by two different Class Loaders and are therefore considered different classes. Java does not allow the line (Test t=(Test)o;), where there is an attempt to cast an object of type o to an object of type Test since the o and t classes were loaded by different class loaders. This line of code fails because the object looked up using Reflection is coming from a different class loader and, even though it is an instance of a Test object, it was loaded in a different class loader so the cast fails.

Conventionally, the developer may be required to use the Java Reflection API or some other remote invocation method (e.g. RMI/IIOP) in order to invoke the proper run method of "o". However, this typically requires a fair amount of coding, which reduces the readability, reliability and maintainability of the code. As the interaction between two applications gets more complicated, this approach quickly becomes prohibitive. As an alternative, instead of using normal Java method invocation (e.g. Test.run), an RPC technology such as RMI/IIOP could be used to perform test execution and return results. However, that involves serializing data, using a wire protocol, etc.

Figure 6:
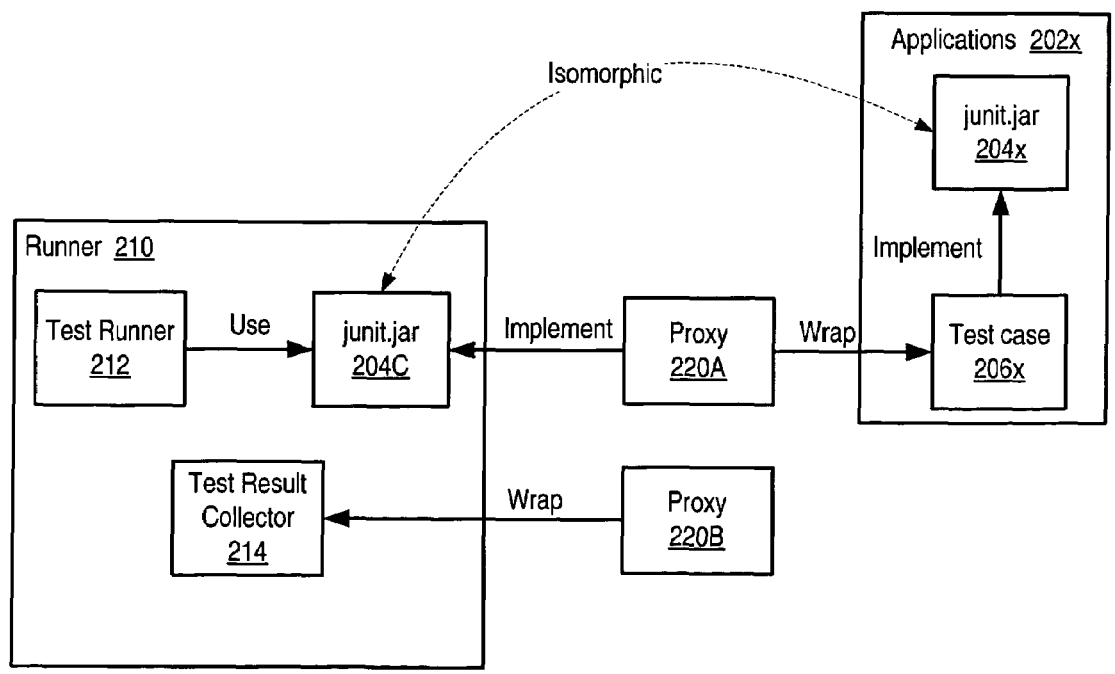

This problem may be solved by using an embodiment of the proxy mechanism, as illustrated in FIG. 6. In FIG. 6, runner 210 is the third application that collects the test cases and tries to run them. Applications 202*x* represents either or both of the applications 202A and 202B of FIG. 5, each with their own version of JUnit 204. The proxy mechanism provides a dynamic mechanism that allows the code in runner 210 to invoke methods on the classes in applications 202*x* without needing to do the cast or any of the Reflection work.

In one embodiment, before starting to run the tests, dynamic proxy objects are generated at runtime that are capable of handling the complexities of forwarding a method invocation (such as calling "t.run") to the proper class without having to worry about the casting or the complexity of Reflection. Instead of simply casting the Test object o, the developer may dynamically generate a proxy for the object "o" using the proxy mechanism, for example using the following exemplary line of code (which is not intended to be limiting):
    Test t = (Test)Proxy.wrap(o, Test.class, new Class[ ]{TestListener.class});

This exemplary line of code tells the proxy mechanism the type of object that a proxy is to be generated for. In this exemplary line of code, "o" is the JUnit test that the test runner wants to invoke. Test.class is the class provided by the JUnit framework. new Class[ ] {TestListener.class} is another part of the interface that needs to be proxied.

TestListener is a class defined by JUnit. TestResultCollector is a class that implements that interface. As a test is being run in the remote application, the test needs to call methods back in the test runner to report whether tests passed or failed, etc. The interface to those methods also need to be wrapped in a proxy.

Referring again to FIG. 6, a proxy object 220A is created "behind the scenes" to wrap "o" by the proxy mechanism, and that proxy object 220A is returned. When the run method is invoked, the invocation goes to the proxy object 220A, then finally to "o". The proxy object 220A does the work (e.g., using Reflection) in a transparent manner. This solution works even if the versions of JUnit are different among the applications (although they all must at least expose a Test interface with the proper run method signature).

FIG. 6 also illustrates another proxy 220B for a Test Result collector 214. When calling the run method, an object may be passed in as a parameter. Test Result collector 214 knows about this object, but the applications 206x do not know about this object, so the object needs to be wrapped in a proxy. The proxying mechanism creates another proxy behind the scenes for the object. Thus, applications 206x have test cases. Test Runner 212 runs the test cases for the applications 206x, and the proxy 220B allows the applications 206x to report the test results back to the Test Result collector 214.

The application 206x transparently uses the proxy for TestResultCollector. All the application 206x knows is that it is an application that deploys a set of JUnit tests that can be run, and that it provides a way of accessing the tests. That is the only necessary contract.

The complexity in writing the Reflection code to do all of this would be very tedious and does not scale well for complicated test frameworks. Embodiments allow the dynamic generation of all the proxies up front, and thus hide all of the complicated Reflection code in a library that can be invoked with a single method call to set everything up. The user simply identifies which objects need to be proxied and tells the proxy generator what the objects are. The proxy generator then generates the dynamic proxies needed to forward calls back and forth to the proper objects.

In some cases, parameter types as well as return types may need to be proxied. For example, if the test runner 212 invokes the run method on application 202A, and the return type from application 202A is an instance of a class that was loaded in application 202A's class loader, the reverse case may apply—the test runner 212 trying to call a method on a class that was loaded in a different class loader. Using the proxy mechanism, application 202A may return a proxy to its return type so that the test runner 212 can invoke it.

Figure 7:
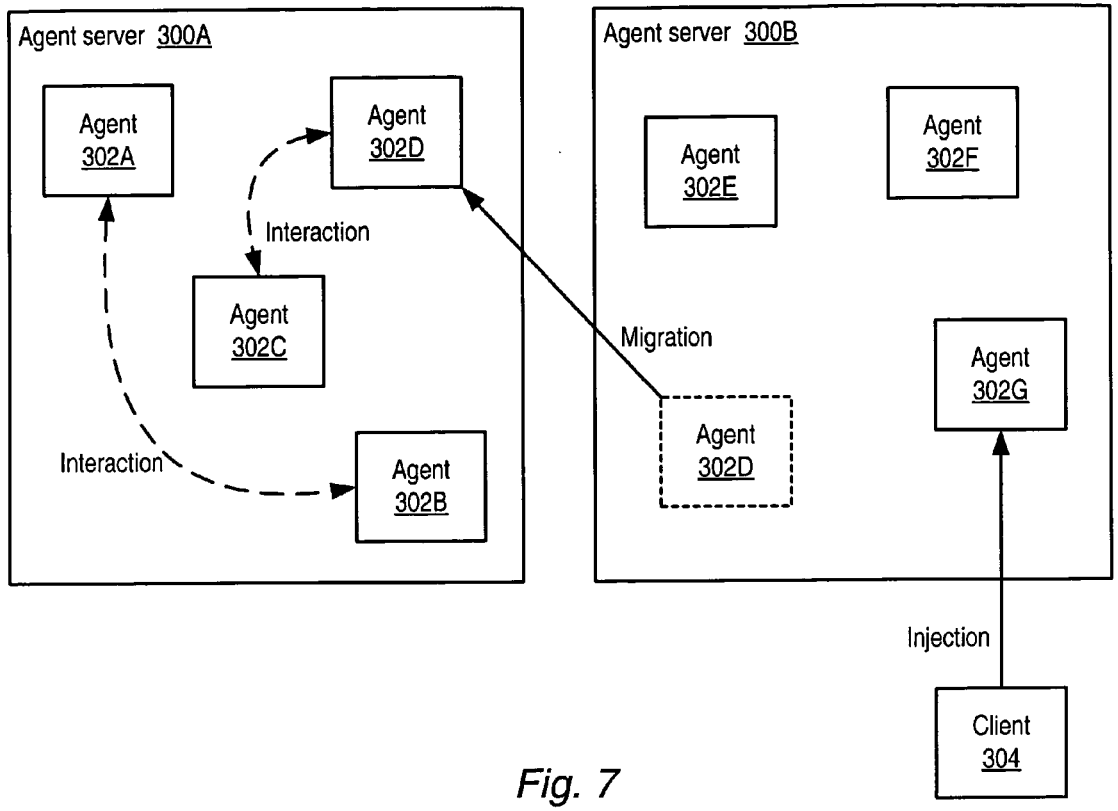
FIGS. 7 and 8 illustrate mobile agents within a Mobile Agent System as an exemplary potential use case for an embodiment of the proxy mechanism.

A second exemplary potential use case for embodiments of the proxy mechanism is with Mobile Agents (e.g. Java Mobile Agents), as illustrated in FIG. 7. "Mobile Agent System" is an architecture where autonomous computer programs (agents 302) may migrate from machine to machine (e.g. agent servers 300A and 300B) in order to interact with other programs (including, but not limited to, other agents 302) and perform tasks. An example of such an architecture may be a university-wide agent network where students may write and use mobile agents to buy and/or sell used textbooks, collect exam information, or arrange for ride sharing during breaks.

Typically, mobile agents 302 are autonomous programs and have to carry around all the supporting libraries that they use. In addition, since agents 302 should not interfere with each other, care has to be taken by the agent servers 300 to isolate the agents 302 into separate "sandboxes" (a protected environment in which code (e.g. Java code) can run safely). Typically, this separation is facilitated by having a separate class loader for each agent 302.

In the agent framework, there may be multiple independent programs (e.g. agents 302) running inside a server (e.g. agent servers 300A and 300B). As mentioned, an agent server 300 typically includes an isolation mechanism to place each agent 302 into its own "sandbox", typically by using separate class loaders. However, the agents 302 typically need to interact with each other (or with other programs) to do something useful. The typical way that two programs (e.g. Java programs) interact with each other is by defining a set of contracts and following the contracts to communicate with each other. One way to define contracts is by defining interfaces (e.g. Java interfaces, for Java programs). Note that other methods to define contracts are available (e.g. using TCP or some other communications protocol).

An agent server 300 is agnostic to the contracts. The contracts are defined by the interested parties and implemented by their agents 302. The server 300 provides a space for agents 302 to interact, and is not interested in knowing any particular contracts. Each agent 302 carries its own contract; the server 300 does not provide the contracts. In this example, there may be two or more agents 302 with the same contract, but since the agents 302 have their own copies of the contracts and are invoked by different class loaders, they cannot directly communicate. Conventionally, these agents may have to rely on Reflection or some other I/O level protocol (e.g. RMI) hard-coded into the agent code for communication.

The following is an exemplary scenario for a "textbook trading interface" where a protocol is defined for agents to exchange used textbook information and possibly to sell or buy the textbooks. In a Java environment, this may be more easily done if the protocol is defined in terms of Java interfaces rather than using a stream protocol such as TCP. This example uses Java agent servers 300 and Java agents 302 that use Java interfaces to define contracts between agents 302 for illustrative purposes, but note that other methods and/or programming languages may be used. Two sets of interfaces are defined, one for a buyer and one for a seller, and the way the interfaces interact with each other is defined:

```
interface Buyer {
boolean isInterestedIn(String bookTitle);
. . .
}
interface Seller {
int quote(String bookTitle);
Iterator iterateInventory( );
. . .
}
```

Now suppose two textbook trading agents, a first agent 302A interested in selling and a second agent 302B interested in buying, meet in an agent server 300A. Since the agent server 300A isolates the two agents in their respective sandboxes, both of the agents need to carry their own copies of the interface; in other words, both agents include a Buyer interface and a Seller interface. This makes it difficult for agent 302A and agent 302B to communicate with each other. For example, the following exemplary pseudocode would not work because two copies of the trading interface are separately loaded into the JVM (by each agent's respective class loader), and therefore considered different classes which cannot easily interact:

Agent 302B:
    Seller seller = askServerForAnySellerInTheSameServer
( );
    int price = seller.quote("Quantum Theory of Fields");
    if (price >50)
    not interested;
    else
    enter into a negotiation;

In this exemplary pseudocode, Agent 302B cannot make a direct call to Agent 302A (the seller); the line "int price = seller.quote("Quantum Theory of Fields");" would fail because, even though the two contracts are isomorphic, as far as Java is concerned they are considered different.

Conventionally, two agents 302 may be able to communicate by using an inter-object communication interface, such as RMI/IIOP, sockets, or other arbitrary stream channels. However, some of these techniques may require going through untyped byte streams as the communication channel. Thus, they incur a performance penalty, and may require extensive coding by the agent developers and/or the contract developers. Alternatively, conventionally, two agents 302 may be able to communicate using the Reflection API. However, using Reflection may require extensive, and potentially fragile, Reflection code to be hard-coded into the agent code; the more complicated the interface is, the more complicated, and fragile, the Reflection code becomes.

Figure 8:
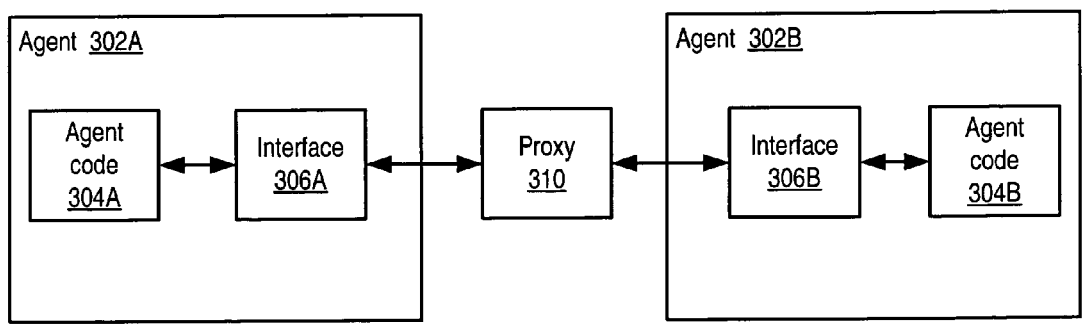

These problems may be transparently solved by using an embodiment of the proxy mechanism as illustrated in FIG. 8. Before the agent server returns a reference of agent 302A to agent 302B, the agent server may use the proxy mechanism to generate a proxy 310 to adapt agent 302A into agent 302B's trading interface. In this way, agents may be written as above, and contracts may be easily defined, without going through untyped byte streams or requiring extensive coding by developers.

An agent server 300 may provide the proxy mechanism "behind the scenes". The proxy mechanism does not need to know about specific contracts. As far as the two agents 302 are concerned, everything is handled transparently by the proxy mechanism. Without the proxy mechanism, each agent 302 would have to rely on some tedious mechanism that may require extensive coding by developers to communicate with other agents 302.

Contracts between agents 302 may evolve. At any given time, a server 300 may host different versions of the same contract. One agent 302 may be using one version of a contract, while another agent 302 may be using a different version within the same virtual machine. If that contract was within the server 300 itself, one or more agents 302 may break. A server 300 can only have one version of a contract. Embodiments of the proxy mechanism allow agents 302 to each carry its own contract by providing the agents 302 a mechanism to communicate with each other. Each agent 302 just needs to carry the necessary files (e.g. JAR files and/or class) files for the contract, but does not need to manifest the version of the contract. The server 302 may be responsible for generating the proxies using the proxy mechanism. When new code migrates into a server (e.g., in FIG. 7, agent 302D migrating into agent server 300A), the server may generate new proxies for whatever interfaces the agent supports. In one embodiment, when an agent 302 tries to talk to another agent 302, the call goes through the server, and the server may intercept the call and generate the necessary proxies using the proxy mechanism at that time.

In addition, embodiments of the proxy mechanism may provide a solution to the additional versioning issue. The contract between agents may evolve, and therefore an agent server may have other agents, e.g. agents 302C and 302D of FIG. 7, that use a different version of the textbook trading interface without interfering with agents 302A and 302B. Thus, embodiments may simplify keeping backward compatibility for agents 302 using different versions of a contract in an agent server 300. Embodiments allow agents 300 that have older versions of the contract to run in the latest version of the server along with agents 300 that have newer versions of the contract. Without the proxy mechanism, the contract would have to be tediously and carefully evolved to keep from breaking existing agents.

Note that, with the proxy mechanism, two agents 302 that are using different versions of the contract may not be able to communicate with each other. For example, agents 302A and 302C of FIG. 7 may note be able to communicate. Using an embodiment of the proxy mechanism, two agents 302 (e.g. agents 302A and 302B) using one version of the contract are able to communicate with each other, and another two agents (e.g. agents 302C and 302D) within the same server 300 using another version of the contract are able to communicate with each other.

CONCLUSION

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A system, comprising:
one or more processors; and
a memory storing program instructions, wherein the program instructions are executable by the one or more processors to implement:
a virtual machine;
a plurality of subsystems configured to execute within the virtual machine, wherein two or more of the plurality of subsystems provide different versions of an isomorphic interface to functions of the subsystems; and
a proxy mechanism configured to generate, for one of the plurality of subsystems at runtime of the one of the plurality of subsystems, a proxy to a version of the isomorphic interface provided by a particular one of the two or more subsystems;
wherein the proxy is configured to:
receive a call to the isomorphic interface from the one of the plurality of subsystems;

convert the call in accordance with the version of the isomorphic interface provided by the particular one of the two or more subsystems; and forward the converted call to the particular one of the two or more subsystems for execution; and wherein the proxy mechanism is further configured to generate, for another one of the plurality of subsystems at runtime of the one of the plurality of subsystems, another proxy to a different version of the isomorphic interface provided by another one of the two or more subsystems.

2. The system as recited in claim 1, wherein, to generate a proxy to a version of the isomorphic interface provided by a particular one of the two or more subsystems, the proxy mechanism is further configured to determine that the particular one of the two or more subsystems provides a correct version of the isomorphic interface for the one of the plurality of subsystems.

3. The system as recited in claim 2, wherein the one of the plurality of subsystems is configured to specify the isomorphic interface to be proxied to the proxy mechanism, and wherein the proxy mechanism is further configured to determine that the particular one of the two or more subsystems provides the correct version of the isomorphic interface according to said specification and to generate the proxy according to said specification.

4. The system as recited in claim 1, wherein the proxy mechanism is further configured to generate another proxy configured to return results of said execution from the particular one of the two or more subsystems to the one of the plurality of subsystems.

5. The system as recited in claim 1, wherein the proxy mechanism is further configured to:

receive the call to the isomorphic interface from the one of the plurality of subsystems; and generate the proxy to the version of the isomorphic interface provided by the particular one of the two or more subsystems in response to said call to the isomorphic interface.

6. The system as recited in claim 1, wherein the proxy mechanism is further configured to provide an interface to the proxy mechanism for the plurality of subsystems, wherein the interface is readable by the subsystems to specify isomorphic interfaces provided by other ones of the subsystems to be proxied to by the proxy mechanism.

7. The system as recited in claim 1, wherein the proxy is further configured to convert the call in accordance with the version of the isomorphic interface provided by the particular one of the two or more subsystems using Java Reflection.

8. The system as recited in claim 1, wherein the virtual machine is a Java Virtual Machine (JVM).

9. The system as recited in claim 1, wherein the one of the plurality of subsystems is an application, and wherein the two or more subsystems are versions of a runtime library.

10. The system as recited in claim 1, wherein the one of the plurality of subsystems and the two or more subsystems are applications.

11. The system as recited in claim 1, wherein the plurality of subsystems are mobile agents.

12. A system, comprising:

one or more processors; and a memory storing program instructions, wherein the program instructions are executable by the one or more processors to implement:

a virtual machine;

a plurality of subsystems configured to execute within the virtual machine; and a proxy mechanism configured to:

generate a proxy for a version of an interface between two of the plurality of subsystems at runtime of at least one of the two subsystems, wherein the proxy is configured to convert calls between the two subsystems in accordance with the version of the interface; and generate another proxy for another version of the interface between another two of the plurality of subsystems at runtime of at least one of the other two of the plurality of subsystems, wherein the other proxy is configured to convert calls between the other two of the plurality of subsystems in accordance with the other version of the interface.

13. The system as recited in claim 12, wherein the proxy is configured to:

receive from a first of the two subsystems a call to a second of the two subsystems;

convert the call in accordance with the version of the interface; and forward the converted call to the second subsystem for execution by the second subsystem.

14. The system as recited in claim 13, wherein the proxy mechanism is further configured to generate another proxy configured to return results of said execution from the second subsystem to the first subsystem.

15. The system as recited in claim 13, wherein the proxy mechanism is further configured to generate the proxy for the version of the interface between the two subsystems in response to said call to the second subsystem.

16. The system as recited in claim 13, wherein the proxies are configured to convert the calls between the subsystems using Java Reflection.

17. The system as recited in claim 12, wherein a first of the two subsystems is configured to specify the interface to be proxied to the proxy mechanism, and wherein the proxy mechanism is further configured to generate the proxy for the interface between the two subsystems in accordance with said specification.

18. The system as recited in claim 12, wherein the virtual machine is a Java Virtual Machine (JVM).

19. A system, comprising:

a processor; and a memory comprising program instructions, wherein the program instructions are executable by the processor to implement a proxy mechanism configured to generate, for a subsystem at runtime of the subsystem, a proxy to a version of an isomorphic interface provided by a particular one of a plurality of subsystems that provide versions of the isomorphic interface;

wherein the proxy is configured to:

receive a call to the isomorphic interface from the subsystem;

convert the call in accordance with the version of the isomorphic interface provided by the particular one of the plurality of subsystems; and forward the converted call to the particular one of the plurality of subsystems for execution; and wherein the proxy mechanism is further configured to generate, for a different subsystem at runtime of a different subsystem, another proxy to another one of the plurality of subsystems that provides a different version of the isomorphic interface.

20. The system as recited in claim 19, wherein the proxy mechanism is further configured to generate another proxy configured to return results of said execution from the particular one of the plurality of subsystems to the subsystem.

21. The system as recited in claim 19, wherein the subsystem is configured to specify the isomorphic interface to be proxied to the proxy mechanism, and wherein the proxy mechanism is further configured to generate the proxy according to said specification.

22. The system as recited in claim 19, wherein the program instructions are executable by the processor to implement a virtual machine in the memory, wherein the proxy mechanism, the subsystems, and the proxy are configured to operate within the virtual machine.

23. The system as recited in claim 22, wherein the virtual machine is a Java Virtual Machine (JVM).

24. The system as recited in claim 19, wherein the proxy is further configured to convert the call in accordance with the version of the isomorphic interface provided by the particular one of the plurality of subsystems using Java Reflection.

25. A computer system, comprising:
means for generating a proxy to a version of an isomorphic interface provided by two or more subsystems for one or more other subsystems in a virtual machine at runtime of at least one of the one or more other subsystems;
means for generating another proxy to another version of the isomorphic interface provided by the two or more subsystems for the one or more other subsystems in the virtual machine at runtime of at least one of the one or more other subsystems;
means for the proxies to convert calls from the one or more other subsystems to the versions of the isomorphic interface provided by the two or more subsystems; and
means for the proxies to forward the converted calls to the two or more subsystems for execution.

26. A computer-implemented method, comprising:
a proxy mechanism generating, for a subsystem at runtime of the subsystem, a proxy to a version of an isomorphic interface provided by a particular one of a plurality of subsystems that provide versions of the isomorphic interface;
the proxy receiving a call to the isomorphic interface from the subsystem;
the proxy converting the call in accordance with the version of the isomorphic interface provided by the particular one of the plurality of subsystems;
the proxy forwarding the converted call to the particular one of the plurality of subsystems for execution; and
the proxy mechanism generating another proxy to another one of the plurality of subsystems that provides a different version of the isomorphic interface for another subsystem at runtime of the other subsystem.

27. The computer-implemented method as recited in claim 26, further comprising:
the proxy mechanism generating another proxy configured to return results of executing the call from the particular one of the plurality of subsystems to the subsystem;
the particular one of the plurality of subsystems executing the call; and
the other proxy returning results of said executing the call to the subsystem.

28. The computer-implemented method as recited in claim 26, further comprising the subsystem specifying the isomorphic interface to be proxied to the proxy mechanism, wherein the proxy mechanism generates the proxy to the particular one of the plurality of subsystems according to said specification.

29. The computer-implemented method as recited in claim 26, further comprising the proxy mechanism receiving the call to the isomorphic interface, wherein the proxy mechanism generates the proxy to the particular one of the plurality of subsystems in response to said receiving the call.

30. The computer-implemented method as recited in claim 26, wherein the proxy converts the call using Java Reflection.

31. The computer-implemented method as recited in claim 26, wherein the proxy mechanism, the subsystems, and the proxy are implemented within a computer-implemented virtual machine.

32. The computer-implemented method as recited in claim 26, wherein the subsystem is an application, and wherein the plurality of subsystems are versions of a runtime library.

33. The computer-implemented method as recited in claim 26, wherein the subsystem and the plurality of subsystems are applications.

34. The computer-implemented method as recited in claim 26, wherein the subsystem and the plurality of subsystems are mobile agents.

35. A computer-implemented method, comprising:
generating a proxy for a version of an interface between two of a plurality of subsystems in a virtual machine at runtime of at least one of the two subsystems, wherein the proxy is configured to convert calls between the two subsystems in accordance with the version of the interface; and
generating another proxy for another version of the interface between another two of the plurality of subsystems at runtime of at least one of the other two of the plurality of subsystems, wherein the other proxy is configured to convert calls between the other two of the plurality of subsystems in accordance with the other version of the interface.

36. The computer-implemented method as recited in claim 35, further comprising:
the proxy receiving from a first of the two subsystems a call to a second of the two subsystems;
the proxy converting the call in accordance with the version of the interface; and
the proxy forwarding the converted call to the second subsystem for execution by the second subsystem.

37. The computer-implemented method as recited in claim 36, wherein the proxy converts the call in accordance with the version of the interface using Java Reflection.

38. The computer-implemented method as recited in claim 36, further comprising generating another proxy configured to return results of said execution from the second subsystem to the first subsystem.

39. The computer-implemented method as recited in claim 36, further comprising generating the proxy for the version of the interface between the two subsystems in response to said call to the second subsystem.

40. The computer-implemented method as recited in claim 35, further comprising:
a first of the two subsystems specifying the interface to be proxied; and
generating the proxy for the interface between the two subsystems in accordance with said specification.

41. The computer-implemented method as recited in claim 35, wherein the virtual machine is a Java Virtual Machine (JVM).

42. A computer-readable storage media comprising program instructions, wherein the program instructions are computer-executable to implement:

a proxy mechanism generating, for a subsystem at runtime of the subsystem, a proxy to a version of an isomorphic interface provided by a particular one of a plurality of subsystems that provide versions of the isomorphic interface;

the proxy receiving a call to the isomorphic interface from the subsystem;

the proxy converting the call in accordance with the version of the isomorphic interface provided by the particular one of the plurality of subsystems;

the proxy forwarding the converted call to the particular one of the plurality of subsystems for execution; and the proxy mechanism generating another proxy to another one of the plurality of subsystems that provides a different version of the isomorphic interface for another subsystem at runtime of the other subsystem.

43. The computer-readable storage media as recited in claim 42, wherein the program instructions are further computer-executable to implement:

the proxy mechanism generating another proxy configured to return results of executing the call from the particular one of the plurality of subsystems to the subsystem;

the particular one of the plurality of subsystems executing the call; and the other proxy returning results of said executing the call to the subsystem.

44. The computer-readable storage media as recited in claim 42, wherein the program instructions are further computer-executable to implement the subsystem specifying the isomorphic interface to be proxied to the proxy mechanism, wherein the proxy mechanism generates the proxy to the particular one of the plurality of subsystems according to said specification.

45. The computer-readable storage media as recited in claim 42, wherein the program instructions are further computer-executable to implement the proxy mechanism receiving the call to the isomorphic interface, wherein the proxy mechanism generates the proxy to the particular one of the plurality of subsystems in response to said receiving the call.

46. The computer-readable storage media as recited in claim 42, wherein the proxy converts the call using Java Reflection.

47. The computer-readable storage media as recited in claim 42, wherein the proxy mechanism, the subsystems, and the proxy are implemented within a virtual machine.

48. The computer-readable storage media as recited in claim 42, wherein the subsystem is an application, and wherein the plurality of subsystems are versions of a runtime library.

49. The computer-readable storage media as recited in claim 42, wherein the subsystem and the plurality of subsystems are applications.

50. The computer-readable storage media as recited in claim 42, wherein the subsystem and the plurality of subsystems are mobile agents.

51. A computer-readable storage media comprising program instructions, wherein the program instructions are computer-executable to implement:

generating a proxy for a version of an interface between two of a plurality of subsystems in a virtual machine at runtime of at least one of the two subsystems, wherein the proxy is configured to convert calls between the two subsystems in accordance with the version of the interface; and generating another proxy for another version of the interface between another two of the plurality of subsystems at runtime of at least one of the other two of the plurality of subsystems, wherein the other proxy is configured to convert calls between the other two of the plurality of subsystems in accordance with the other version of the interface.

52. The computer-readable storage media as recited in claim 51, wherein the program instructions are further computer-executable to implement:

the proxy receiving from a first of the two subsystems a call to a second of the two subsystems;

the proxy converting the call in accordance with the version of the interface; and the proxy forwarding the converted call to the second subsystem for execution by the second subsystem.

53. The computer-readable storage media as recited in claim 52, wherein the proxy converts the call in accordance with the version of the interface using Java Reflection.

54. The computer-readable storage media as recited in claim 52, wherein the program instructions are further computer-executable to implement generating another proxy configured to return results of said execution from the second subsystem to the first subsystem.

55. The computer-readable storage media as recited in claim 52, wherein the program instructions are further computer-executable to implement generating the proxy for the version of the interface between the two subsystems in response to said call to the second subsystem.

56. The computer-readable storage media as recited in claim 51, wherein the program instructions are further computer-executable to implement:

a first of the two subsystems specifying the interface to be proxied; and generating the proxy for the interface between the two subsystems in accordance with said specification.

57. The computer-readable storage media as recited in claim 51, wherein the virtual machine is a Java Virtual Machine (JVM).

* * * * *